(12) United States Patent
Donner

(10) Patent No.: US 11,958,659 B2
(45) Date of Patent: Apr. 16, 2024

(54) PLASTIC FILM BOTTOM BAG AND USE THEREOF AS WELL AS BLANK FOR A PLASTIC FILM BOTTOM BAG

(71) Applicant: Mettler Packaging LLC, Raynham, MA (US)

(72) Inventor: Georg Donner, Morbach (DE)

(73) Assignee: Mettler Packaging LLC, Raynham, MA (US)

( * ) Notice: Subject to any disclaimer, the term of this patent is extended or adjusted under 35 U.S.C. 154(b) by 0 days.

(21) Appl. No.: 17/194,040

(22) Filed: Mar. 5, 2021

(65) Prior Publication Data

US 2021/0276764 A1   Sep. 9, 2021

(30) Foreign Application Priority Data

Mar. 5, 2020   (EP) .................................... 20161169

(51) Int. Cl.
  *B65D 30/20* (2006.01)
  *B65D 33/02* (2006.01)
  *B65D 33/08* (2006.01)
  *B65D 33/10* (2006.01)

(52) U.S. Cl.
  CPC ............. *B65D 31/10* (2013.01); *B65D 33/02* (2013.01); *B65D 33/08* (2013.01); *B65D 33/105* (2013.01)

(58) Field of Classification Search
  CPC ........ B65D 31/10; B65D 33/02; B65D 33/08; B65D 33/105; B65D 75/008
  USPC .......................................... 383/104, 122, 10
  See application file for complete search history.

(56) References Cited

U.S. PATENT DOCUMENTS

| | | | | |
|---|---|---|---|---|
| 3,136,475 A | * | 6/1964 | Geimer | B65D 31/08 383/122 |
| 3,462,067 A | | 8/1969 | Shore | |
| 3,568,918 A | * | 3/1971 | Blomqvist | B65D 33/02 383/109 |

(Continued)

FOREIGN PATENT DOCUMENTS

| | | |
|---|---|---|
| CA | 2035644 A1 | 8/1991 |
| DE | 40 12 897 A1 | 8/1991 |

(Continued)

OTHER PUBLICATIONS

Machine translation of JP-03029753-A.*
Machine translation of JP-2002332049-A.*
Machine translation of JP-06179454-A.*
Machine translation of JP-2009078859-A.*
European Search Report for EP Application No. 20161169.6 dated May 26, 2020, 7 pgs.

(Continued)

*Primary Examiner* — Jes F Pascua
(74) *Attorney, Agent, or Firm* — Seed IP Law Group LLP

(57) ABSTRACT

A plastic film bottom bag has a plastic film front wall that is welded or adhesively joined to side wall sections of adjoining plastic film side walls, and/or a plastic film rear wall that is welded or adhesively joined to the side wall sections of the adjoining plastic film side walls, so as to form a seam or casing seam. Further disclosed is a plastic film bottom bag, in which at least one, in particular both, plastic film side walls are provided with a side fold that comprises a welded or adhesive joint extending from or at a distance from the bag opening edge in the direction of the bag end or up to the bag end. The disclosure further relates to blanks for the plastic film bottom bags described herein and to the use of the plastic film bottom bags described herein, as reusable bags or reusable handbags.

33 Claims, 13 Drawing Sheets

(56) References Cited

U.S. PATENT DOCUMENTS

| | | | | |
|---|---|---|---|---|
| 3,618,478 | A | * | 11/1971 | Piazze ................ B31B 70/00 493/194 |
| 3,738,565 | A | * | 6/1973 | Ackley ................ B65D 31/00 383/104 |
| 3,739,977 | A | * | 6/1973 | Shapiro ............... B65D 31/00 383/104 |
| 4,526,565 | A | * | 7/1985 | Hummel ............. B29C 65/223 493/196 |
| 4,848,930 | A | * | 7/1989 | Williams ............ B65D 31/00 383/104 |
| 6,334,710 | B1 | | 1/2002 | Kuge et al. |
| 6,394,143 | B1 | | 5/2002 | Diels et al. |
| 6,461,041 | B1 | | 10/2002 | Simhaee |
| 6,767,317 | B2 | | 7/2004 | Simhaee |
| 10,334,819 | B2 | | 7/2019 | Dumm |
| 2006/0078233 | A1 | * | 4/2006 | Winiecki ............. B65D 33/105 383/104 |
| 2007/0071370 | A1 | * | 3/2007 | Schneider ............ B65D 33/02 383/119 |
| 2011/0019943 | A1 | * | 1/2011 | Piraneo ............... B65D 31/10 383/104 |
| 2015/0329259 | A1 | * | 11/2015 | Varbanov .............. B65B 1/04 383/42 |
| 2019/0021279 | A1 | | 1/2019 | Dumm |
| 2021/0339914 | A1 | * | 11/2021 | Kuge ................. B65D 31/08 |
| 2023/0113515 | A1 | * | 4/2023 | Umenaka ............. B31B 70/10 493/186 |

FOREIGN PATENT DOCUMENTS

| | | | |
|---|---|---|---|
| DE | 101 16 920 A1 | | 10/2002 |
| FR | 1 283 386 A | | 2/1962 |
| JP | S5084443 U | | 7/1975 |
| JP | 03029753 A | * | 2/1991 |
| JP | 06179454 A | * | 6/1994 |
| JP | 06219454 A | * | 8/1994 |
| JP | 09099958 A | * | 4/1997 |
| JP | 11123777 A | * | 5/1999 |
| JP | 2002332049 A | * | 11/2002 |
| JP | 2009078859 A | * | 4/2009 |
| WO | 96/10524 A2 | | 4/1996 |
| WO | 01/51372 A1 | | 7/2001 |
| WO | 2018/091073 A1 | | 5/2018 |

OTHER PUBLICATIONS

Examination Report for EP Application No. 20161169.6 dated Jul. 5, 2022, 5 pgs.
Chilean INAPI Search Report for Application No. 00544-2021, dated Mar. 14, 2022, 3 pages.
Chilean INAPI Search Report for Application No. 00544-2021, dated Dec. 13, 2022, 3 pages.
Chilean INAPI Patents Search Database summary of CL 200201503 (S.A.C.I. Falabella), (machine translation), dated Nov. 6, 2023, 2 pages.

* cited by examiner

US 11,958,659 B2

PLASTIC FILM BOTTOM BAG AND USE THEREOF AS WELL AS BLANK FOR A PLASTIC FILM BOTTOM BAG

BACKGROUND

Technical Field

The present disclosure relates to a reusable plastic film bottom bag (i.e., a reusable bag made of plastic film and having a bottom) and the use thereof, as well as a blank for a plastic film bottom bag.

Description of the Related Art

Carrier bags, such as those usually provided by retailers to customers for transporting goods, are routinely made of plastic or paper. Although these transport receptacles have hitherto been repeatedly provided for single use, there is now increased demand for suitable transport containers which can be consistently reused. In addition to carrier bags made of textile materials, recyclable plastic carrier bags, typically in the form of flexiloop carrier bags, are frequently also used for this purpose. Such conventional flexiloop bags are disclosed, for example in DE 101 16 920 A1, WO 01/51372 A1, and DE 40 12 897 A1.

Reusable plastic carrier bags are regularly considerably larger than single-use carrier bags made of plastic. This requires sufficient load-bearing strength. This is because the mechanical wear otherwise impedes reusability. However, larger-sized recyclable plastic carrier bags are associated with the problem of insufficient sturdiness. That is, only after the plastic carrier bag has been filled to a certain degree is the filling opening generally in a state that filling is possible without the bag walls or the handles having to be held by a hand.

Thus, there is accordingly a need to provide a plastic bag which is no longer subject to the described disadvantages of the prior art and which, in some cases, allows unimpaired, in some other cases two-handed, filling, especially in an unfilled state There is also a need to provide a plastic bag which, in an unfilled state, can be stood in such a way that an opening with a sufficiently large cross section is obtained, and which remains self-sustaining.

BRIEF SUMMARY

Consequently, according to aspects of one or more design variants, a plastic film bottom bag (i.e., a plastic film bag with a bottom) having a bag opening and an opposite bag end has been found, comprising:
 a plastic film front wall having a bag opening edge and a first side edge and an opposite second side edge,
 a plastic film rear wall having a bag opening edge and having a first side edge and an opposite second side edge,
 a first plastic film side wall having a bag opening edge and having a first side fold welded or adhesive joint or first side fold extending from or at a distance from the bag opening edge in the direction of the bag end or up to the bag end, the first plastic film side wall comprising, on either side of the first side fold welded or adhesive joint or the first side fold, a first side wall section and a second side wall section, which extend from the first side fold welded or adhesive joint or the first side fold to the first side edge of the plastic film front wall and to the first side edge of the plastic film layer rear wall, respectively,
 a second plastic film side wall having a bag opening edge and having a second side fold welded or adhesive joint or second side fold extending from or at a distance from the bag opening edge in the direction of the bag end or up to the bag end, the second plastic film side wall comprising, on either side of the second side fold welded or adhesive joint or the second side fold, a first side wall section and a second side wall section, which extend from the second side fold welded or adhesive joint or the second side fold to the second side edge of the plastic film front wall and to the second side edge of the plastic film rear wall, respectively, and
 a plastic film bag bottom having an inner side and an outer side,
 wherein, in at least one embodiment, at least the first plastic film side wall or the second plastic film side wall is provided with the first or second side fold welded or adhesive joint.

BRIEF DESCRIPTION OF THE DRAWINGS

Further features and advantages of the present disclosure arise from the following description, in which exemplary embodiments of the present disclosure are explained by way of example with reference to schematic drawings, without thereby limiting the present disclosure.

DETAILED DESCRIPTION

Figure 1:
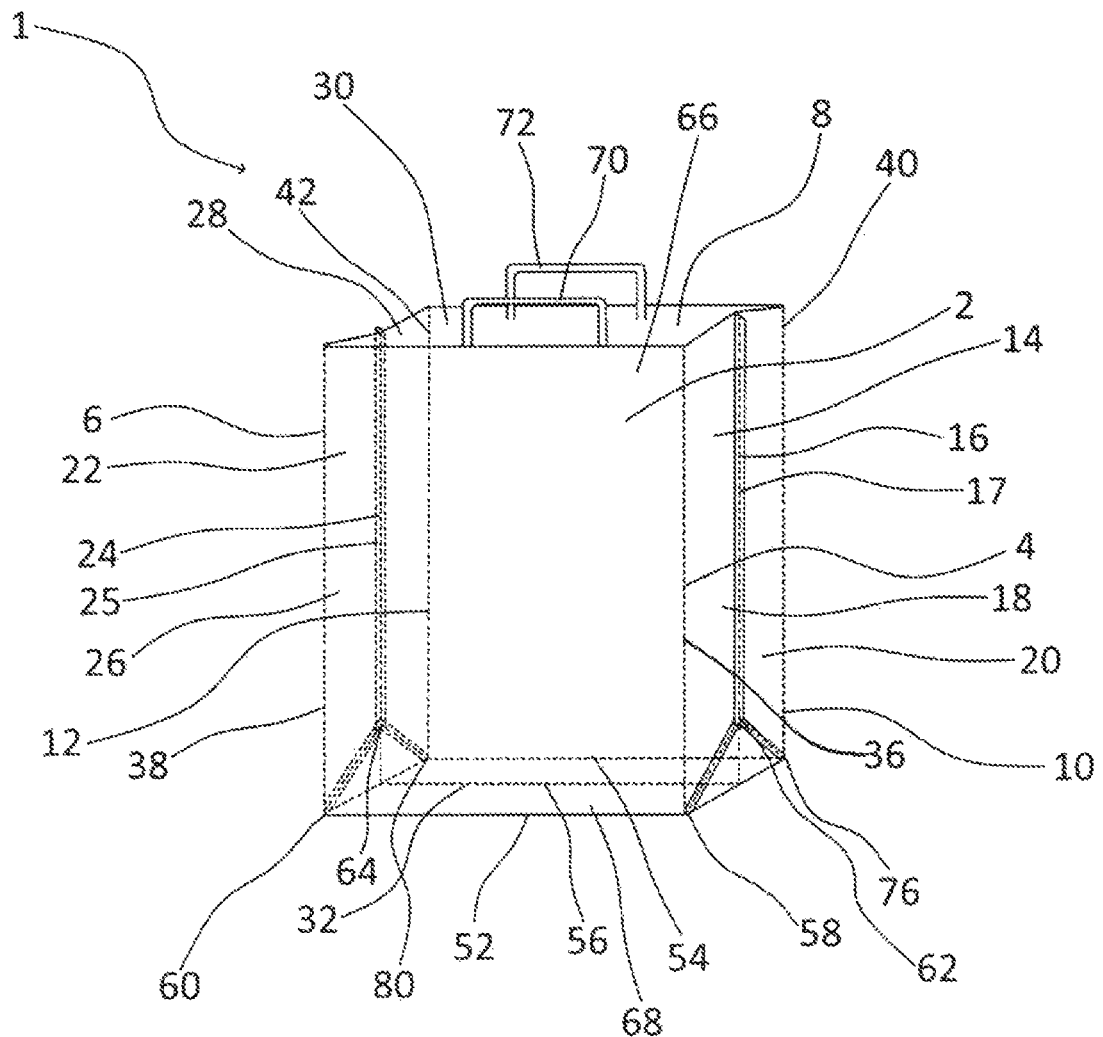
FIG. 1 shows a schematic perspective side view of an embodiment of a first design variant of a plastic film bottom bag according to the present disclosure.

According to an expedient embodiment of the present disclosure, a high degree of sturdiness and a consistently wide-opened bag opening are obtained with a first design variant of the plastic film bottom bag according to the present disclosure such that the first plastic film side wall is provided with the first side fold welded or adhesive joint, in some cases side fold welded joint, and/or the second plastic film side wall is provided with the second side fold welded or adhesive joint, in some cases side fold welded joint. In the preceding embodiment, the side fold welded or adhesive joint, in some cases side fold welded joint, is present in each case in a region of the side folds of the first plastic film side wall and second plastic film side wall. The present disclosure further discloses a configuration in which, in the case of one of the two film side walls, the side fold is designed as a side fold welded or adhesive joint, in some cases side fold welded joint.

According to the present disclosure, the term side fold welded or adhesive joint is not intended to automatically mean that the first and the second side wall sections of a side wall have to be connected to one another via this welded or adhesive joint. Rather, the first and second side wall sections can also be in one piece. In this case, the welded or adhesive joint, in in some cases welded joint, is present in the transition from the first to the second side wall section.

A plastic film bottom bag according to the first design variant, which is free and in some cases stable in an unfilled state and has a consistently sufficiently wide-opened bag opening, is also obtained in an expedient embodiment such that the first side fold welded or adhesive joint, in some cases side fold welded joint, present between the first side wall section and the second side wall section of the first side wall, constitutes an outwardly facing side fold welded or adhesive joint seam, or that the second side fold welded or adhesive joint, in some cases side fold welded joint, present between the first side wall section and the second side wall section of the second side wall, constitutes an outwardly facing side fold welded or adhesive joint seam. Advantageous results are obtained when both the first and the second side fold welded or adhesive joints, in some cases side fold welded joints, each constitute an outwardly facing side fold welded or adhesive joint seam. This adhesive or welded seam has an average width in a range from 1.0 to 4.0 mm, in some cases in a range from 1.5 to 3.5 mm, in highly expedient embodiments.

The present disclosure further provides plastic film bottom bags according to the first design variant, in which a fold, in some cases crease, is present in the transition from the plastic film front wall to the first side wall section of the first plastic film side wall, or in which a fold, in some cases crease, is present in the transition from the plastic film front wall to the first side wall section of the second plastic film side wall, or in which a fold, in some cases crease, is present in the transition from the plastic film rear wall to the second side wall section of the first plastic film side wall, or in which a fold, in some cases crease, is present in the transition from the plastic film rear wall to the second side wall section of the second plastic film side wall. Such configurations are highly expedient in which a fold, in some cases crease, is present in the transition from the plastic film front wall to the first side wall section of the first plastic film side wall, and in which, furthermore, a fold, in some cases crease, is present in the transition from the plastic film front wall to the first side wall section of the second plastic film side wall, and in which a fold, in some cases crease, is present also in the transition from the plastic film rear wall to the second side wall section of the first plastic film side wall, and in which a fold, in some cases crease, is present in the transition from the plastic film rear wall to the second side wall section of the second plastic film side wall.

The present disclosure further provides plastic film bottom bags according to the first design variant of the present disclosure, in which in the transition from the plastic film front wall to the first side wall section of the first plastic film side wall, in some cases along and in the region of the fold, in some cases crease, the plastic film front wall and the first side wall section of the first plastic film side wall are welded or adhesively bonded to one another, in some cases welded, in some cases so as to form a seam or casing seam, or in which in the transition from the plastic film front wall to the first side wall section of the second plastic film side wall, in some cases along and in the region of the fold, in some cases crease, the plastic film front wall and the second side wall section of the first plastic film side wall are welded or adhesively bonded to one another, in some cases welded, in some cases so as to form a seam or casing seam, or in which in the transition from the plastic film rear wall to the second side wall section of the first plastic film side wall, in some cases along and in the region of the fold, in some cases crease, the plastic film rear wall and the second side wall section of the first plastic film side wall are welded or adhesively bonded to one another, in some cases welded, in some cases so as to form a seam or casing seam, or in which in the transition from the plastic film rear wall to the second side wall section of the second plastic film side wall, in some cases along and in the region of the fold, in some cases crease, the plastic film rear wall and the second side wall section of the second plastic film side wall are welded or adhesively bonded to one another, in some cases welded, in some cases so as to form a seam or casing seam. This embodiment is also referred to as the third embodiment of the plastic film bottom bag according to the present disclosure. Such embodiments are highly expedient for this purpose in which in the transition from the plastic film front wall to the first side wall section of the first plastic film side wall, in some cases along and in the region of the fold, in some cases crease, the plastic film front wall and the first side wall section of the first plastic film side wall are welded or adhesively bonded to one another, in some cases welded, and in which in the transition from the plastic film front wall to the first side wall section of the second plastic film side wall, in some cases along and in the region of the fold, in some cases crease, the plastic film front wall and the second side wall section of the first plastic film side wall are welded or adhesively bonded to one another, in some cases welded, and/or, in some cases and, in which in the transition from the plastic film rear wall to the second side wall section of the first plastic film side wall, in some cases along and in the region of the fold, in some cases crease, the plastic film rear wall and the second side wall section of the first plastic film side wall are welded or adhesively bonded to one another, in some cases welded, and in which in the transition from the plastic film rear wall to the second side wall section of the second plastic film side wall, in some cases along and in the region of the fold, in some cases crease, the plastic film rear wall and the second side wall section of the second plastic film side wall are welded or adhesively bonded to one another, in some cases welded.

The present disclosure further provides a second design variant of a plastic film bottom bag according to the present disclosure having a bag opening and an opposite bag end, comprising
  a plastic film front wall having a bag opening edge and a first side edge and an opposite second side edge, a plastic film rear wall having a bag opening edge and having a first side edge and an opposite second side edge, a first plastic film side wall having a bag opening edge and having a first side fold extending from or at a distance from the bag opening edge in the direction of the bag end or up to the bag end, the first plastic film side wall comprising, on either side of the first side fold, a first side wall section and a second side wall section which extend from the first side fold up to the first side edge of the plastic film front wall and to the first side edge of the plastic film layer rear wall, respectively, a second plastic film side wall having a bag opening edge and having a second side fold extending from or at a distance from the bag opening edge in the direction of the bag end or up to the bag end, the second plastic film side wall comprising, on either side of the second side fold, a first side wall section and a second side wall section which extend from the second side fold up to the second side edge of the plastic film front wall and to the second side edge of the plastic film rear wall, respectively, and a plastic film bag bottom having an inner side and an outer side, wherein, in the transition from the plastic film front wall to the first side wall section of the first plastic film side wall, in some cases along and in the region of a fold or crease, the plastic film front wall and the first side wall section of the first plastic film side wall are welded or adhesively bonded to one another, in some cases welded, in some cases so as to form a seam or casing seam, and/or wherein in the transition from the plastic film front wall to the first side wall section of the second plastic film side wall, in some cases along and in the region of a fold or crease, the plastic film front wall and the second side wall section of the first plastic film side wall are welded or adhesively bonded to one another, in some cases welded, in some cases so as to form a seam or casing seam, and/or wherein in the transition from the plastic film front wall to the second side wall section of the first plastic film side wall, in some cases along and in the region of a fold or crease, the plastic film rear wall and the second side wall section of the first plastic film side wall are welded or adhesively bonded to one another, in some cases welded, in some cases so as to form a seam or casing seam, or wherein in the transition from the plastic film rear wall to the second side wall section of the second plastic film side wall, in some cases along and in the region of a fold or crease, the plastic film rear wall and the second side wall section of the second plastic film side wall are welded or adhesively bonded to one another, in some cases welded, in some cases so as to form a seam or casing seam.

In the second design variant of the plastic film bottom bag according to the present disclosure, in some cases a pronounced sturdiness and independent bag opening is also achieved in that in the transition from the plastic film front wall to the first side wall section of the first plastic film side wall, in some cases along and in the region of a fold or crease, the plastic film front wall and the first side wall section of the first plastic film side wall are welded or adhesively bonded to one another, in some cases welded, in some cases so as to form a seam or casing seam, and in the transition from the plastic film front wall to the first side wall section of the second plastic film side wall, in some cases along and in the region of a fold or crease, the plastic film front wall and the second side wall section of the first plastic film side wall are welded or adhesively bonded to one another, in some cases welded, in some cases so as to form a seam or casing seam, and/or, in some cases and, in the transition from the plastic film rear wall to the second side wall section of the first plastic film side wall, in some cases along and in the region of a fold or crease, the plastic film rear wall and the second side wall section of the first plastic film side wall are welded or adhesively bonded to one another, in some cases welded, in some cases so as to form a seam or casing seam, and in the transition from the plastic film rear wall to the second side wall section of the second plastic film side wall, in some cases along and in the region of a fold or crease, the plastic film rear wall and the second side wall section of the second plastic film side wall are welded or adhesively bonded to one another, in some cases welded, in some cases so as to form a seam or casing seam.

According to the present disclosure, there is a crease if the same has been produced with the aid of a tool provided for this purpose or a machine provided for this purpose. Such mechanically produced creases are regularly designed in the form of a bent edge. If such a bent edge is produced without the aid of a tool, a fold is to be understood here according to the present disclosure.

The present disclosure further provides such plastic film bottom bags of the second design variant according to the present disclosure in which the first side fold is formed in sections or completely in the form of a, in some cases outwardly facing, side fold welded or adhesive joint, and/or in which the second side fold is formed in sections or completely in the form of a, in some cases outwardly facing, side fold welded or adhesive joint. This embodiment substantially corresponds to a third design variant of a plastic film bottom bag according to the present disclosure. The third design variant of a plastic film bottom bag according to the present disclosure combines the embodiments of the first and second design variants with respect to the side fold welded or adhesive joint(s) and the welding or adhesive bonding of the plastic film front wall and plastic film rear wall to the respective plastic film side walls. The third design variant of a plastic film bottom bag according to the present disclosure can thus be achieved proceeding from the first design variant as well as proceeding from the second design variant.

Expedient results are also obtained in the second design variant when both the first and the second side fold welded or adhesive joint, in some cases side fold welded joint, each constitute an outwardly facing side fold welded joint seam or side fold adhesive joint seam. In the second design variant, this adhesive and in some cases welded seam also has an average width in a range from 1.0 to 4.0 mm, in some cases in a range from 1.5 to 3.5 mm, in highly expedient embodiments.

Very good sturdiness and extremely reliable provision of a bag opening, suitable for filling, of a free-standing plastic film bottom bag according to the present disclosure can be achieved surprisingly both for the first design variant and also the second design variant when it is ensured that the plastic film front wall has a single-layer or multi-layer film strip on the inside and/or outside in the region of the bag opening edge, or that the first plastic film rear wall has a single-layer or multi-layer film strip on the inside and/or outside in the region of the bag opening edge, or that the first plastic film side wall has a single-layer or multi-layer film strip on the inside and/or outside in the region of the bag opening edge, or that the second plastic film side wall has a single-layer or multi-layer film strip on the inside and/or outside in the region of the bag opening edge. Such embodiments are highly expedient in which the plastic film front wall has a single-layer or multi-layer film strip on the inside and/or outside, in some cases on the inside, in the region of the bag opening edge, and the plastic film rear wall has a single-layer or multi-layer film strip on the inside and/or outside, in some cases on the inside, in the region of the bag opening edge. Embodiments of this type are very highly expedient in which the plastic film front wall on the inside and/or outside, in some cases on the inside, in the region of the bag opening edge has a single-layer or multi-layer film strip, the plastic film rear wall has a single-layer or multi-layer film strip on the inside and/or outside, in some cases on the inside, in the region of the bag opening edge, the first plastic film side wall has a single-layer or multi-layer film strip on the inside and/or outside, in some cases on the inside, in the region of the bag opening edge, and the second plastic film side wall has a single-layer or multi-layer film strip on the inside and/or outside, in some cases on the inside, in the region of the bag opening edge.

In this case, the single- or multi-layer film strip, in some cases as a component of the plastic film front wall, the plastic film rear wall, the first plastic film side wall, and/or the second plastic film side wall, generally constitutes an opening edge seam. In this case, highly expediently, the film strips can each also be formed in one piece with the plastic film front wall, the plastic film rear wall, the first plastic film side wall, or the second plastic film side wall.

Consequently, in one embodiment, the opening edge can be formed by folding at the upper end of the plastic film front wall or the plastic film rear wall. If, for example, a multi-layer plastic film front wall or plastic film rear wall is used, the single-layer or multi-layer film strip can be obtained by folding over one or more layers of this multi-layer system.

For many applications, it has proven to be highly expedient to use a single- or multi-layer film material for the plastic film front wall and/or plastic film rear wall for the plastic film bottom bag, according to the present disclosure, of the first and the second design variant. Suitable plastic materials are polyolefins such as polyethylene and/or polypropylene, and in a highly expedient configuration HD polyethylene.

In one embodiment, the plastic film bottom bag according to the present disclosure can be formed substantially in one piece.

In a further, highly expedient embodiment, the plastic film front wall, the plastic film bag bottom, and the plastic film rear wall can be present in a contiguous manner, expediently without a connecting joint and highly expediently in one piece.

In a further, likewise highly expedient embodiment, the plastic film front wall, the first side wall section of the first plastic film side wall, and the first side wall section of the second plastic film side wall can be present in a contiguous manner, expediently without a connecting joint and highly expediently in one piece.

And in a further highly expedient embodiment, additionally or alternatively, the plastic film rear wall, the second side wall section of the first plastic film side wall, and the second side wall section of the second plastic film side wall can be present in a contiguous manner, expediently without a connecting joint and highly expediently in one piece.

Using the above-described embodiments of highly expedient embodiments, the plastic film bottom bag, according to the present disclosure, of the first and second design variant can be manufactured in such a way that the first side wall section and the second side wall section forming the first side wall are connected to one another in the region of the first side fold welded or adhesive joint, and that the first and second side wall sections forming the second side wall are connected to one another in the region of the second side fold welded or adhesive joint.

A plastic film bottom bag according to the present disclosure is thus also characterized in one embodiment by the fact that, in addition to (or other than) the first and second side fold welded or adhesive joint in the region of the plastic film front wall, the plastic film rear wall, the first plastic film side wall, and the second plastic film side wall, in some cases including the respective transitions, said plastic film bottom bag does not have any further welded joint or adhesive joint extending from or at a distance from the bag opening edge in the direction of the bag end or up to the bag end.

Furthermore, for the plastic film bottom bag according to the present disclosure, provision may be made for a crease or fold (also referred to as a first bottom crease or bottom fold) to be present in the transition from the plastic film front wall to the plastic film bag bottom, and/or for the plastic film front wall and the plastic film bag bottom to be welded, in some cases welded to one another, or adhesively bonded to one another, in the transition from the plastic film front wall to the plastic film bag bottom, in some cases along and in the region of the crease or fold, in some cases so as to form a seam or casing seam. Furthermore, provision may be made, alternatively or in some cases additionally, for there to be a crease or fold (also referred to as a second bottom crease or fold) in the transition from the plastic film rear wall to the plastic film bag bottom, and/or for the plastic film rear wall and the plastic film bag bottom to be welded, in some cases welded to one another, or adhesively bonded to one another, in the transition from the plastic film rear wall to the plastic film bag bottom, in some cases along and in the region of the crease or fold, in some cases so as to form a seam or casing seam. The plastic film bag bottom can also have a center crease which extends at a distance from or from the first side edge in the direction of or up to the opposite second side edge.

Pronounced sturdiness can also be obtained with such plastic film bottom bags in which a fold or crease (also referred to as a third bottom fold or crease) is present in the transition from the first plastic film side wall to the plastic film bag bottom, or in which in some cases in the transition from the first plastic film side wall to the plastic film bag bottom, in some cases along and in the region of the fold or crease, the first plastic film side wall and the plastic film bag bottom are welded, in some cases welded to one another, or adhesively bonded to one another, in some cases so as to form a seam or casing seam. Furthermore, alternatively or in some cases additionally, provision may be made for there to be a fold or crease (also referred to as a fourth bottom fold or crease) in the transition from the second plastic film side wall to the plastic film bag bottom, or for the second plastic film side wall and the plastic film bag bottom to be welded, in some cases welded to one another, or adhesively bonded to one another, in some cases in the transition from the second plastic film side wall to the plastic film bag bottom, in some cases along and in the region of the fold or crease, in some cases so as to form a seam or casing seam.

The present disclosure further provides plastic film bottom bags according to the present disclosure wherein a first welded or adhesive joint, in some cases welded joint, extends from a first mouth point, in which the first bottom crease leads into the first side edge of the plastic film front wall, and the first side fold welded or adhesive joint which ends at a distance from the plastic film bag bottom, and wherein a second welded or adhesive joint, in some cases a welded joint, extends from a second mouth point, in which the second bottom crease leads into the first side edge of the plastic film rear wall, and the first side fold welded or adhesive joint which ends at a distance from the plastic film bag bottom, and/or wherein a third welded or adhesive joint, in some cases welded joint, leads from a third mouth point, in which the first bottom crease leads into the second side edge of the plastic film front wall, and the second side fold welded or adhesive joint which ends at a distance from the plastic film bag bottom, and wherein a fourth welded or adhesive joint, some cases a welded joint, extends from a fourth mouth point, in which the second bottom crease leads into the second side edge of the plastic film rear wall, and the second side fold welded or adhesive joint which ends at a distance from the plastic film bag bottom. In this case, the first side fold welded or adhesive joint, the first welded or adhesive joint and the second welded or adhesive joint preferably have a common mouth region. Alternatively and in some cases additionally, the second side fold welded or adhesive joint, the third welded or adhesive joint, and the fourth welded or adhesive joint have a common mouth region.

In an expedient embodiment of the first design variant of the present disclosure, the first side fold welded or adhesive joint and the second side fold welded or adhesive joint extend up to the bag end, in some cases not adhesively bonded or welded to the plastic film bag bottom, a first welded or adhesive joint, in some cases welded joint, extends from a first mouth point, in which the first bottom crease leads into the first side edge of the plastic film front wall, and the first side fold welded or adhesive joint at a distance from the plastic film bag bottom, and a second welded or adhesive joint, in some cases welded joint, extends from a second mouth point, in which the second bottom crease leads into the first side edge of the plastic film rear wall, and the first side fold welded or adhesive joint at a distance from the plastic film bag bottom, and/or, in some cases and, a third welded or adhesive joint, in some cases welded joint, extends from a third mouth point, in which the first bottom crease leads into the second side edge of the plastic film front wall, and the second side fold welded or adhesive joint at a distance from the plastic film bag bottom, and a fourth welded or adhesive joint, in some cases welded joint, extends from a fourth mouth point, in which the second bottom crease leads into the second side edge of the plastic film rear wall, and the second side fold welded or adhesive joint, at a distance from the plastic film bag bottom.

In this case, the first side fold welded or adhesive joint, the first welded or adhesive joint, and the second welded or adhesive joint have a common first mouth region. Alternatively and in some cases additionally, the second side fold welded or adhesive joint, the third welded or adhesive joint, and the fourth welded or adhesive joint have a common second mouth region.

Such embodiments of the first design variant of the present disclosure are highly expedient in which in the area which spans between the first mouth point, in which the first bottom crease leads into the first side edge of the plastic film front wall, and the second mouth point, in which the second bottom crease leads into the first side edge of the plastic film rear wall, and the first mouth region, two triangular plastic film sections are adjacent, in some cases bear against one another, and/or, in some cases and, in which two triangular plastic film sections are adjacent, in some cases bear against one another, in the area which spans between the third mouth point, in which the first bottom crease leads into the second side edge of the plastic film front wall, and the fourth mouth point, in which the second bottom crease leads into the second side edge of the plastic film rear wall, and the second mouth region. As a result, a high degree of standing stability is obtained.

The plastic film bottom bags, according to the present disclosure, of the first and second design variants are expediently also provided with at least one first carrying element and/or at least one second carrying element. This first and/or second carrying element can be a grip hole, a holding loop, or a handle. The holding loop or the handle are expediently applied or attached to the plastic film front wall and/or to the plastic film rear wall at or adjacent to the bag opening.

Therefore, the first carrying element or its connecting sections can expediently be attached or present in the region of the single-layer or multi-layer film strip, in some cases opening edge seam, of the plastic film front wall, and the second carrying element or its connecting sections can be attached or present in the region of the single- or multi-layer film strip, in some cases opening edge seam, of the plastic film rear wall.

The above-described embodiment of a plastic carrier bag according to the present disclosure also ensures, in addition to excellent ease of carrying, improved mechanical load capacity, in some cases of a reusable plastic carrier bag. Both the holding loop per se and its connection to the body of the plastic carrier bag are characterized by particular tear resistance.

A particularly robust and loadable plastic carrier bag is obtained by combining the features forming the reinforcing region with the features of the holding loop.

The present disclosure also provides such plastic film bottom bags according to the present disclosure in which the at least one layer of a multi-layer front wall and/or rear wall, in some cases the inner layer, comprises or constitutes a foamed plastic film, in some cases a foamed polyolefin film, in some further cases a foamed polyethylene film and in some even further cases a foamed LD polyethylene film. As a result, a textile-like appearance can be reinforced during handling, for example during the folding together, of the plastic carrier bag according to the present disclosure.

In addition, it has surprisingly been found that a highly satisfactory standing of the plastic film bottom bags according to the present disclosure is also achieved in that the plastic film bag bottom has an embossing welding pattern, applied in some cases to the outer side. This embossing welding pattern can be designed, for example, in the form of a honeycomb structure, line structure, or annular structure. Naturally, other, in some cases geometric, embossing patterns are also possible. The use of a honeycomb structure has proven to be highly suitable for many applications.

Alternatively or additionally, the plastic film bottom bags according to the present disclosure can also be provided with an inlay bottom. In this case, use is expediently made of such inlay bottoms which are designed to be more rigid than the plastic film bag bottom. By using an, advantageously removable, in some cases loose, inlay bottom, the sturdiness of the plastic film bottom bags according to the present disclosure can likewise be increased. When inlay bottoms are used, it is also possible to reliably keep the still unfilled plastic film bottom bag open. The inlay bottom can be made, for example, of LD polyethylene, HD polyethylene, or polypropylene.

In addition, the present disclosure provides a blank, also referred to as a first blank, for a plastic film bottom bag, in some cases a plastic film bottom bag according to the present disclosure, made of a single-layer or multi-layer plastic film having a plastic film front wall section, a substantially rectangular or square plastic film bag bottom section adjoining, in some cases integrally, said plastic film front wall section along a first bottom side edge, and a plastic film rear wall section adjoining, in some cases integrally, said plastic film bag bottom section, opposite the plastic film front wall section, along a second bottom side edge, wherein triangular or trapezoidal sections respectively adjoin, in some cases integrally, the opposite bottom side edges of the plastic film bag bottom section which are not connected to the plastic film front wall section and the plastic film rear wall section (also referred to as third and fourth bottom side edges), wherein the plastic film front wall section, at side edge contours opposite one another, in some cases integrally, in each case has an extension section having an inclined bottom-side edge, which forms an obtuse angle ($\alpha$) with the first bottom side edge when the blank is arranged in a plane, wherein the distance between the opposite side edge contours of the plastic film front wall section corresponds substantially to the distance between the third and fourth bottom side edges, and wherein the plastic film rear wall section, at side edge contours opposite each other, in some cases integrally, in each case has an extension section, having an inclined bottom-side edge, which forms an obtuse angle ($\alpha'$) with the second bottom side edge when the blank is arranged in a plane, wherein the distance between the opposite side edge contours of the plastic film rear wall section corresponds substantially to the distance between the third and fourth bottom side edges.

In addition, the present disclosure further provides a blank, also referred to as a second blank, for a plastic film bottom bag, in some cases a plastic film bottom bag according to the present disclosure, in some further cases a plastic film bottom bag, according to the present disclosure, of the third design variant, having a substantially rectangular or square basic shape and made of a single-layer or multi-layer plastic film, comprising a plastic film bag bottom section, a substantially rectangular or square plastic film bag bottom section adjoining, in some cases integrally, said plastic film front wall section along a first bottom side edge, and containing opposite third and fourth bottom side edges, and a plastic film rear wall section adjoining, in some cases integrally, said plastic film bag bottom section, opposite the plastic film front wall section, along a second bottom side edge, wherein the plastic film front wall section in each case has a substantially rectangular extension section, in some cases in one piece, on side edge contours which are opposite each other, wherein the plastic film rear wall section in each case has a substantially rectangular extension section, in some cases in one piece, on side edge contours which are opposite each other, and wherein a welded joint, in some cases so as to form a seam or casing seam, is present in each case along the mutually opposite side edge contours of the plastic film front wall section and wherein a welded joint, in some cases so as to form a seam or casing seam, is present in each case along the mutually opposite side edge contours of the plastic film rear wall section.

In a highly expedient embodiment, the second blank has in each case, along the third and fourth bottom side edges, a welded joint, in some cases so as to form a seam or casing seam, wherein said welded joints merge at their mutually opposite ends substantially without transition into the welded joints which are present along the corresponding side edge contours.

FIG. 1 shows the first design variant of a plastic film bottom bag 1 according to the present disclosure comprising a bag opening 30 and an opposite bag end 32, a plastic film front wall 2 having a bag opening edge and a first side edge 4 and an opposite second side edge 6 and a plastic film rear wall 8 having a bag opening edge as well as a first side edge 10 and an opposite second side edge 12. This plastic film bottom bag 1 is also provided with a first plastic film side wall 14 having a bag opening edge and with a second plastic film side wall 22 having a bag opening edge. The first plastic film side wall 14 has a first side fold welded joint 16 which extends from the bag opening edge almost up to the bag end 32. In the embodiment shown, the first side fold welded joint 16 is present as an outwardly facing side fold welded joint seam 17. Both the orientation of the first side fold welded joint 16 outward, i.e., facing away from the bag interior, as well as the formation of the welded joint as a seam contribute in combination to a highly pronounced sturdiness of the plastic film bottom bag according to the present disclosure. The welded seam can, for example, have an average width in the range from 1.5 to 3.5 mm.

On either side of this first side fold welded joint 16 there are a first side wall section and a second side wall section 18, 20, which each extend from the first side fold welded joint 16 up to the first side edge 4, 10 of the plastic film front wall 2 and the plastic film rear wall 8 respectively. In the same way, the second plastic film side wall 22 has a second side fold welded joint 24 extending from the bag opening edge up to the bag end 32, wherein on either side of this second side fold welded joint 24 there are a first side wall section and a second side wall section 26, 28, which each extend from this second side fold welded joint 24 up to the second side edge 6, 12 of the plastic film front wall 2 and the plastic film rear wall 8 respectively. Similarly, in the embodiment shown, the second side fold welded joint 24 is also formed as an outwardly facing side fold welded joint seam 25.

At the bag end 32 is a plastic film bag bottom 68, which has a first bottom crease 52 in the transition to the front wall 2 and a second bottom crease 54 at the transition to the rear wall 8. A first carrying loop 70 is attached to the plastic film front wall 2 and a second carrying loop 72 is applied to the plastic film rear wall 8. These carrying loops can be designed, for example, in each case in the form of a hollow tube, in some cases double-layer hollow tube. The carrying loops are expediently applied to the inside of the plastic film front wall 2 and the plastic film rear wall 8. The embodiment of a plastic film bottom bag 1 according to the present disclosure shown in FIG. 1 has creases 36, 38 in the transition from the plastic film front wall 2 to the first and second plastic film side walls 14, 22. Similarly, the plastic film bottom bag 1 according to the present disclosure has creases 40, 42 in the transition from the plastic film rear wall 2 to the first and second plastic film side walls 14, 22. In addition, the first design variant of the plastic film bottom bag 1 according to the present disclosure can be provided with a center fold or center crease 56 in the plastic film bag bottom 68. As a result, easier folding is regularly achieved in the packed state.

In terms of production technology, it has been found to be highly expedient in many cases to supplement the plastic film bag bottom 68 on each of the narrow sides with triangular elements, in some expedient cases in one piece, spanned between the mouth or corner points 58, 62, 76 and the mouth or corner points 60, 64, 80. In this embodiment, a connection with the first side wall section 18 of the first side wall 14 is produced along the welded joint between the mouth or corner points 58 and 62, and a connection to the second side wall section 20 of the first side wall 14 is produced along the welded joint between the mouth or corner points 62 and 76. Similarly, there is a connection of the first side wall section 26 of the second side wall 22 along the welded joint between the mouth or corner points 60 and 64, and there is a connection of the second side wall section 28 of the second side wall 22 along the welded joint between the mouth or corner points 64 and 80. The side fold welded joints 16, 24 can extend, for example, up to the corner points or mouth points 62 and 64 of the welded joints 63, 65 and 67, 69 respectively. It has also proven to be expedient in many cases to continue the center fold or center crease 56 present in the plastic film bag bottom 68 beyond the plastic film bag bottom 68 in the triangular elements adjoining the narrow sides up to the corner or mouth points 62 and 64 (see dashed lines).

Details about the production of the welded joints 63, 65 and 67, 69 respectively are described in connection with the description of the blank according to FIG. 8.

Figure 2:
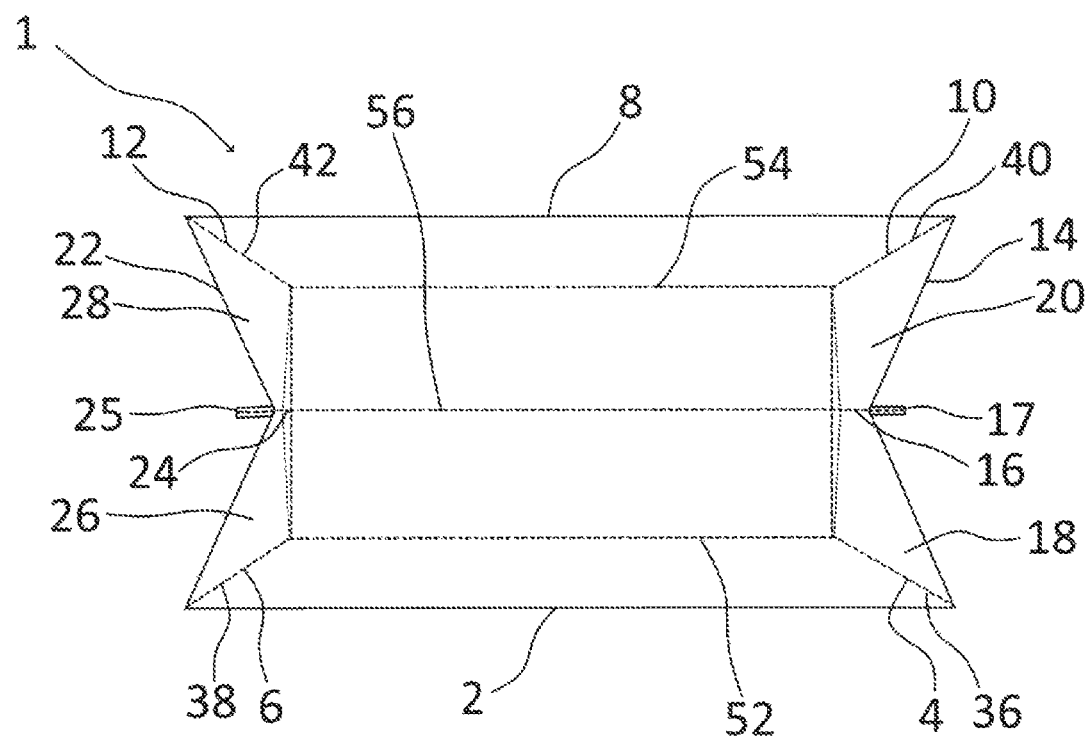
FIG. 2 shows a schematic perspective top view of the embodiment of the plastic film bottom bag of FIG. 1.

The perspective top view of the first design variant of FIG. 1, as shown in FIG. 2, also reveals the structure of the first and second side walls 14, 22. In this case, the first side fold welded joint 16 is designed as an outwardly facing side fold welded joint seam 17. Similarly, the second side fold welded joint 24 is formed as an outwardly facing side fold welded joint seam 25. FIG. 2 clearly shows how large-sized first design variants of the plastic film bottom bag 1 according to the present disclosure, without being filled, provide a satisfactory opening cross section in a free-standing manner which permits immediate unimpeded filling with two hands. A hand does not have to be used to first keep the bag opening open.

Figure 3:
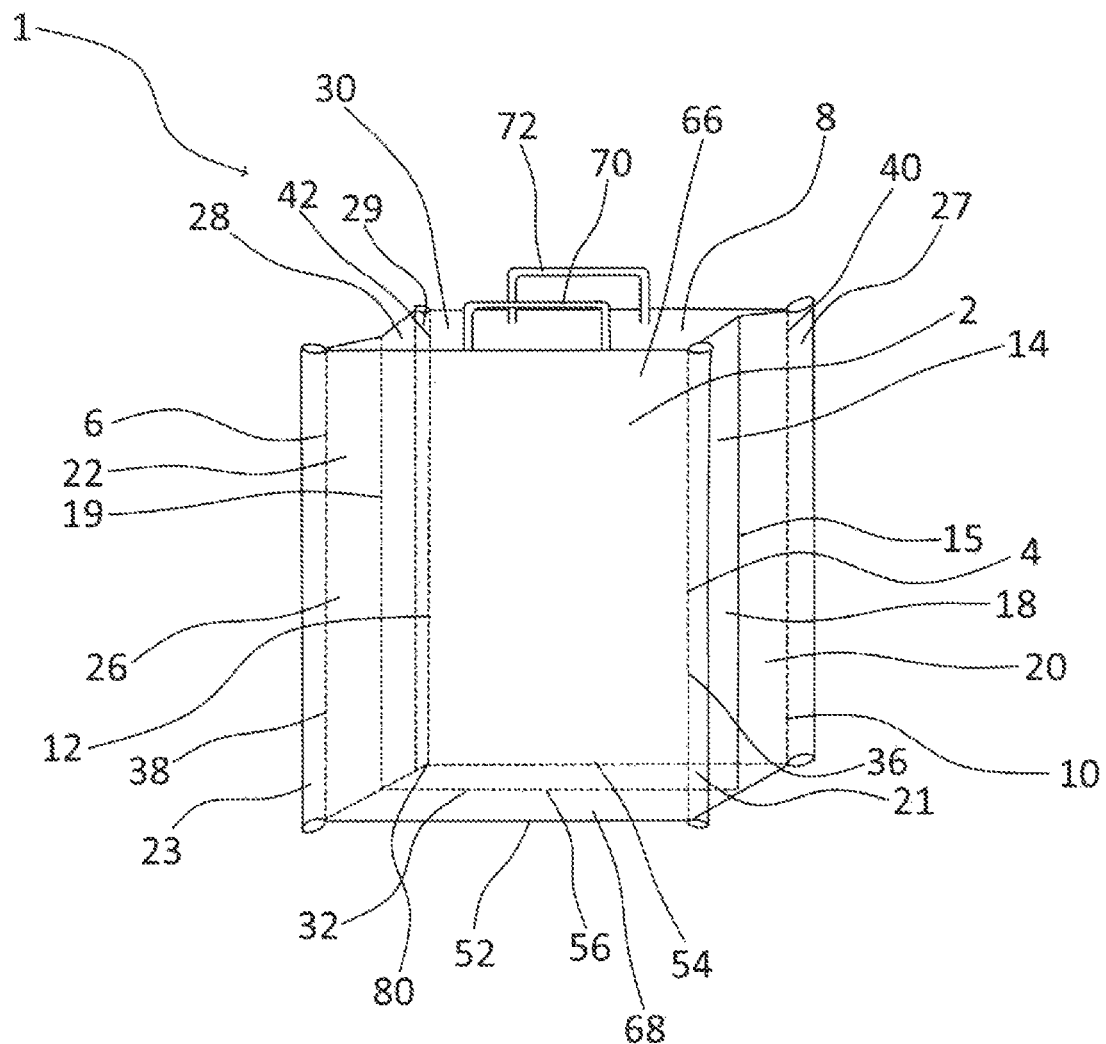
FIG. 3 shows a schematic perspective side view of a second design variant of a plastic film bottom bag according to the present disclosure.

FIG. 3 shows the second design variant of a plastic film bottom bag 1 according to the present disclosure. This plastic film bottom bag 1 according to the present disclosure is also provided with a bag opening 30 and an opposite bag end 32, a plastic film front wall 2 having a bag opening edge and a first side edge 4 and an opposite second side edge 6, and a plastic film rear wall 8 having a bag opening edge as well as a first side edge 10 and an opposite second side edge 12. The plastic film bottom bag 1 according to the present disclosure also has a first plastic film side wall 14 with a bag opening edge and a second plastic film side wall 22 with a bag opening edge. The first plastic film side wall 14 has a first side fold 15 which extends from the bag opening edge substantially up to the bag end 32. This side crease can also be designed as a side fold. On either side of this first side fold 15 there are a first and a second side wall section 18, 20, which each extend from the first side fold 15 up to the first side edge 4, 10 of the plastic film front wall 2 and the plastic film rear wall 8 respectively.

In the same way, the second plastic film side wall 22 has a second side fold 19 extending from the bag opening edge up to the bag end 32, wherein on either side of this second side fold 19 there are a first and a second side wall section 26, 28, which each extend from this second side fold 19 up to the second side edge 6, 12 of the plastic film front wall 2 and the plastic film rear wall 8 respectively. At the bag end 32 is a plastic film bag bottom 68, which has a first bottom crease 52 in the transition to the front wall 2 and a second bottom fold 54 at the transition to the rear wall 8.

Figure 4:
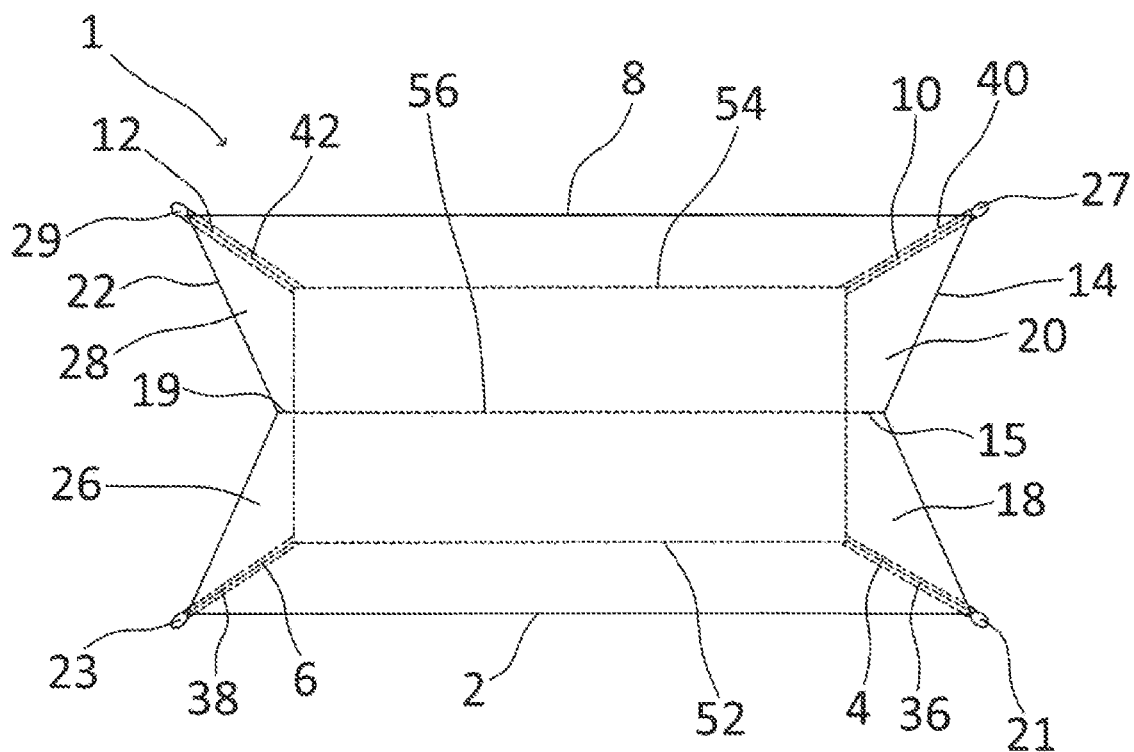
FIG. 4 is a schematic perspective top view of the embodiment of the plastic film bottom bag of FIG. 3.

A first carrying loop 70 is attached to the plastic film front wall 2 and a second carrying loop 72 is applied to the plastic film rear wall 8. In the embodiment of a plastic film bottom bag 1 according to the present disclosure shown in FIG. 3, in the transition from the plastic film front wall 2 to the first and second plastic film side walls 14, 22, this plastic film front wall 2 is welded on the one side to the first plastic film side wall 14 and on the other side to the second plastic film side wall 22 so as to form casing seams 21, 23. Similarly, the plastic film bottom bag 1 according to the present disclosure has casing seams 27, 29 obtained by way of welding in the transition from the plastic film rear wall 2 to the first and second plastic film side walls 14, 22. Instead of the casing seams, welded joints or welded joint seems can also be provided in the transition from the front and rear wall to the respective side walls. In addition, the second design variant of the plastic film bottom bag 1 according to the present disclosure can also be provided with a center fold or a center crease 56 in the plastic film bag bottom 68. By way of applying said casing seams or welded joints or welded seams, large-sized plastic film bottom bags can surprisingly be obtained which, without being filled, provide a satisfactory opening cross section in a free-standing manner which allows an immediate unimpeded filling with two hands, as is shown in FIG. 4 for the second design variant of a plastic film bottom bag, according to the present disclosure, according to FIG. 3.

Figure 5:
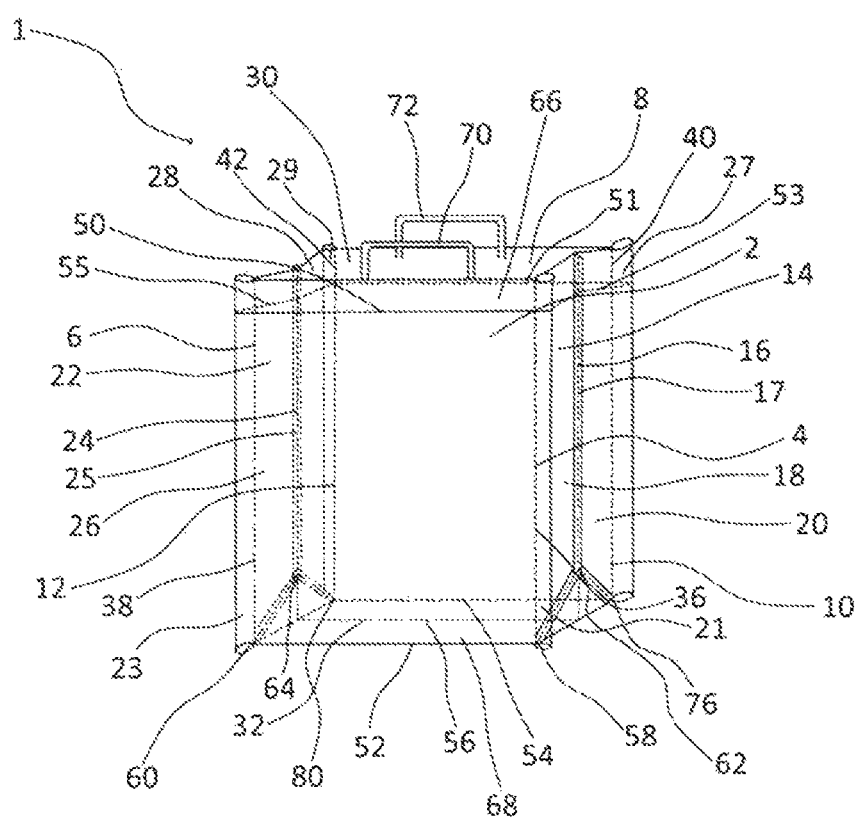
FIG. 5 shows a schematic perspective side view of a third design variant of a plastic film bottom bag according to the present disclosure.

FIG. 5 shows a very highly expedient embodiment of a plastic film bottom bag 1 according to the present disclosure. The side folds of the first and second side walls are designed therein as outwardly facing side fold welded joints 16, 24 or, more specifically, as outwardly facing side fold welded joint seams 17, 25. In the transition from the plastic film front wall 2 to the first and second plastic film side walls 14, 22 there are also casing seams 21, 23 which can be or have been obtained by welding the plastic film front wall 2 on the one side to the first plastic film side wall 14 and on the other side to the second plastic film side wall 22, Similarly, in the transition from the plastic film front wall 8 to the first and second plastic film side walls 14, 22 there are also casing seams 27, 29 which can be or have been obtained by welding the plastic film rear wall 8 on the one side to the first plastic film side wall 14 and on the other side to the second plastic film side wall 22.

Figure 6:
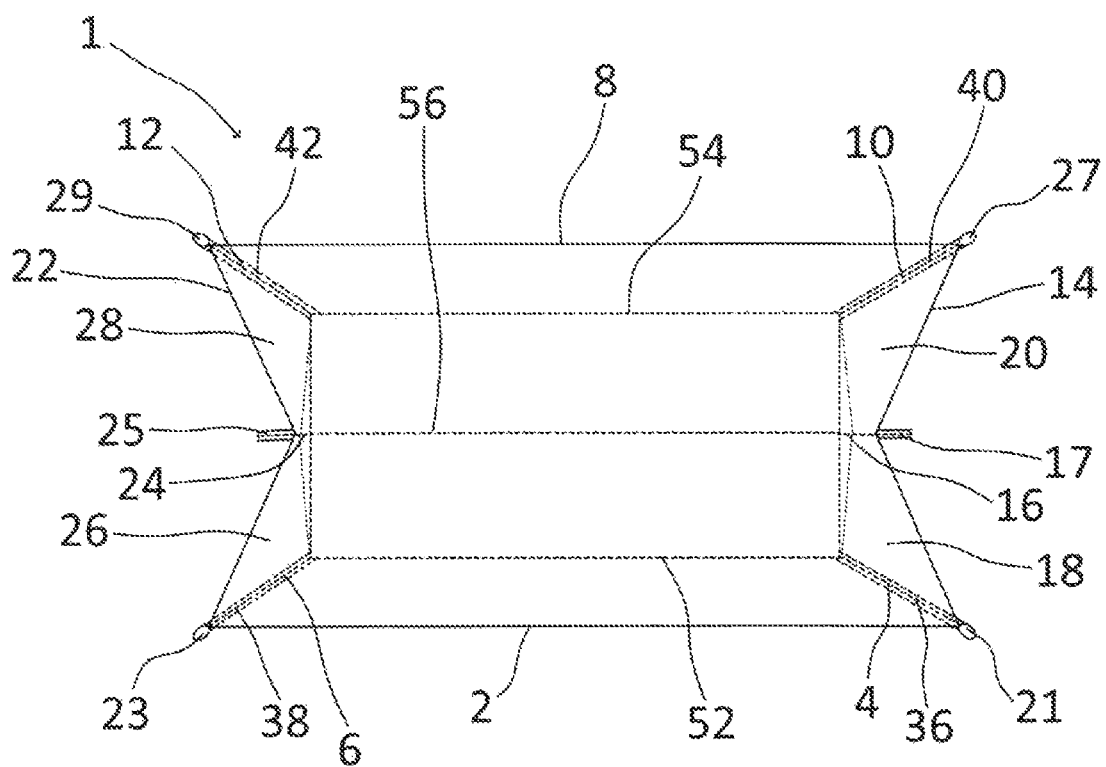
FIG. 6 shows a schematic perspective top view of the embodiment of the plastic film bottom bag of FIG. 5.

In addition, the bag opening edges of the plastic film front wall 2, the plastic film rear wall 8, the first plastic film side wall 14 and the second plastic film side wall 22 in the region of the bag opening 30 are reinforced by a folded-over film strip 50, 51, 53, 55 in the embodiment shown so as to form a peripheral seam. As a result, the present disclosure discloses an expedient, more reliable configuration for the immediate unimpeded filling of a still completely empty bag with two hands, in combination with the side fold welded joints 16, 24 and the casing seams 21, 23, 27, 29 (see also FIG. 6). In the embodiment according to FIG. 5, it has also proven advantageous, in some cases in the handling and folding of the plastic film bottom bag 1 according to the present disclosure, if the center fold or center crease 56 present in the plastic film bag bottom 68 continues beyond the plastic film bag bottom 68 in the triangular elements adjoining the respective narrow sides up to the corner or mouth points 62 and 64 (see dashed lines).

Figure 7:
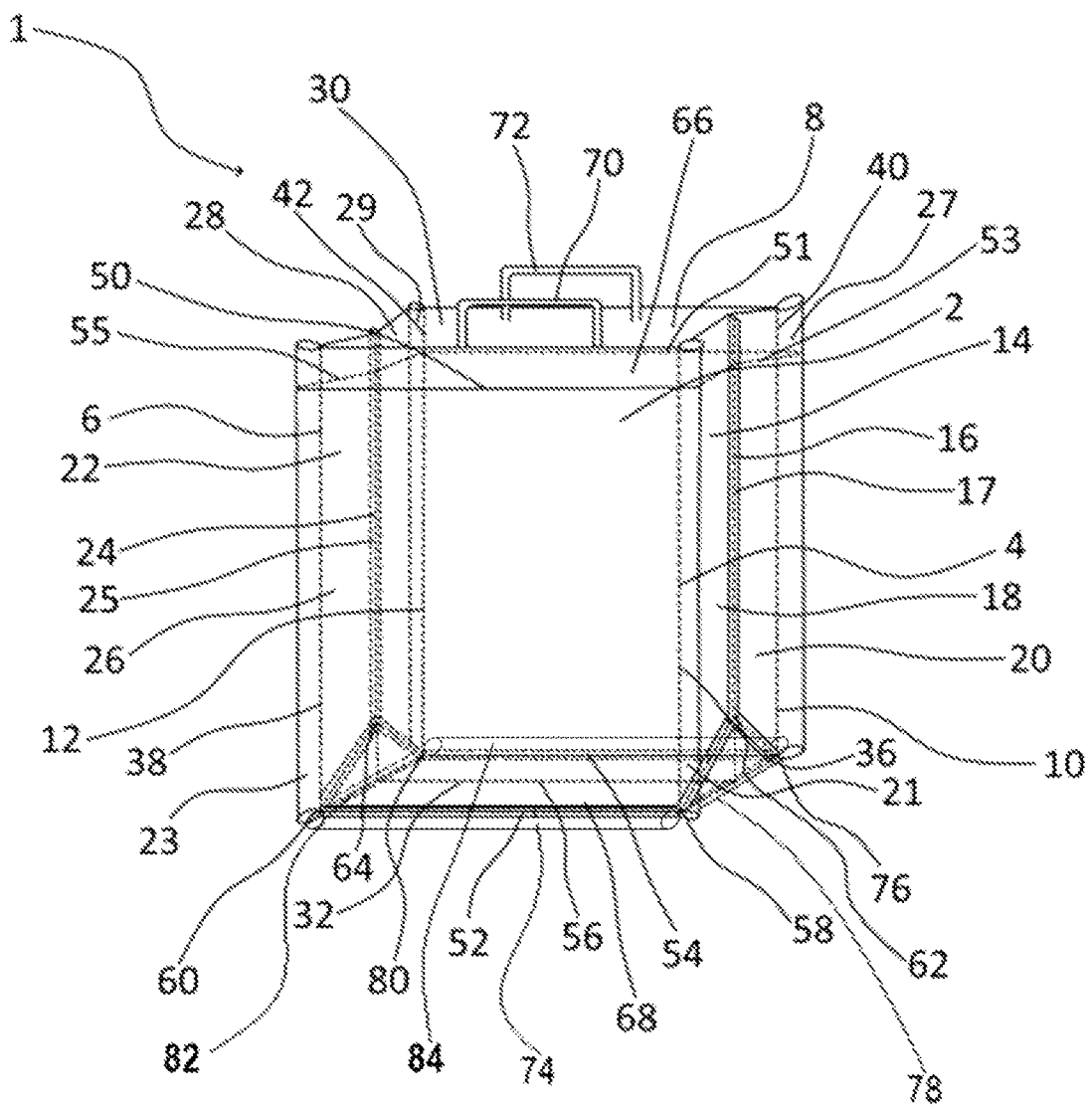
FIG. 7 shows a schematic perspective side view of an expedient embodiment of the third design variant of a plastic film bottom bag according to the present disclosure.

FIG. 7 shows a schematic perspective side view of an expedient embodiment of the third design variant of a plastic film bottom bag according to the present disclosure and can be considered a further development of the plastic film bottom bag according to FIG. 5. The reference signs used in FIG. 7 match the corresponding reference signs of the embodiments shown in FIGS. 1 to 6 for identical components. In addition to the embodiment of the plastic film bottom bag, according to the present disclosure, of FIG. 5, in the case of the plastic film bottom bag according to FIG. 7, the first plastic film side wall 14 and the plastic film bag bottom 68 are welded to one another in the transition from the first plastic film side wall 14 to the plastic film bag bottom 68 so as to form a seam or casing seam 78. Corresponding thereto, in the transition from the second plastic film side wall 22 to the plastic film bag bottom 68, the second plastic film side wall 22 and the plastic film bag bottom 68 are welded so as to form a seam or casing seam 82. In addition, in order to form an even more pronounced sturdiness in the unfilled state, the plastic film front wall 2 and the plastic film bag bottom 68 are welded in the transition from the plastic film front wall 2 to the plastic film bag bottom 68 so as to form a seam or casing seam 74. Corresponding thereto, in the transition from the plastic film rear wall 8 to the plastic film bag bottom 68, the plastic film rear wall 8 and the plastic film bag bottom 68 are welded so as to form a seam or casing seam 84.

Figure 8:
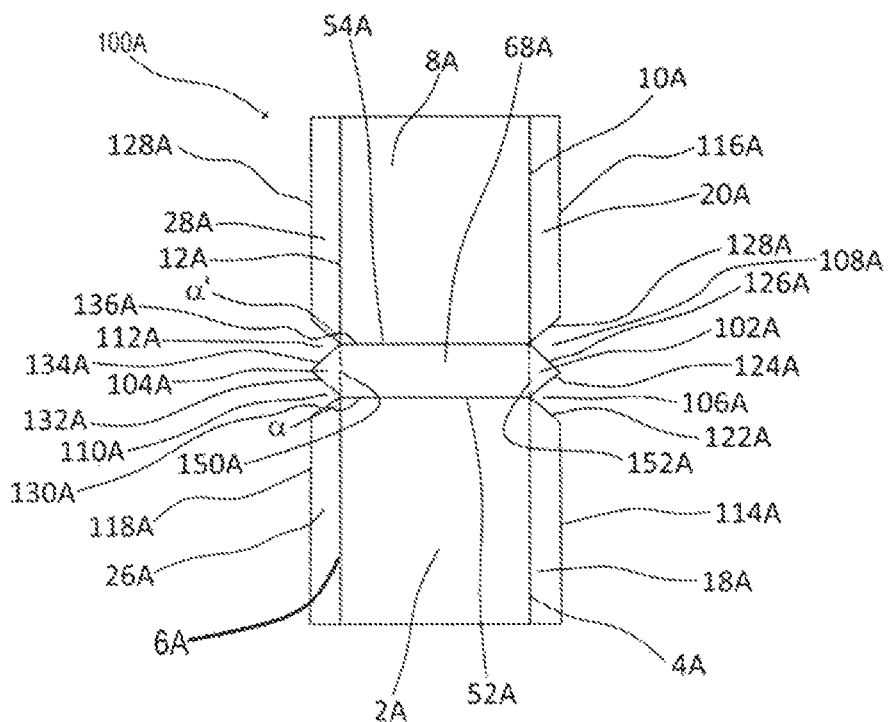
FIG. 8 shows a schematic perspective top view of a film blank for a plastic film bottom bag, according to the present disclosure, of FIG. 1.

FIG. 8 shows a schematic top view of a flat film blank 100A that can be used for the production of the first design variant of a plastic film bottom bag 1 according to the present disclosure, as shown in FIG. 1. The blank 100A has a plastic film front wall section 2A with a bag opening edge and a plastic film rear wall section 8A with a bag opening edge. The first side wall section 18A of the first side wall adjoins the one side of the plastic film front wall section 2A, and the first side wall section 26A of the second side wall adjoins the opposite side. In the embodiment shown, the plastic film front wall section 2A and the first side wall sections 18A, 26A of the first and second side walls, which merge into one another along the side edge contours 4A and 6A, are formed in one piece. There are folds, creases, or welded joints, for example in the form of a casing seam, in the transition from the plastic film front wall section 2A to said first side wall sections 18A, 26A, i.e., along the side edge contours 4A and 6A, in the finished product. Correspondingly thereto, the plastic film rear wall section 8A merges along the side edge contours 10A and 12A into the second side wall section 20A of the first side wall and on the opposite side into the second side wall section 28A of the second side wall. The plastic film front wall section 2A and the plastic film rear wall section 8A are connected to one another in the blank 100 via the plastic film bag bottom section 68A. In the embodiment shown, the plastic film front wall section 2A, including the first side wall sections 18A, 26A, the plastic film rear wall section 8A, including the second side wall sections 20A, 28A, and the plastic film bag bottom section 68A are in one piece. The plastic film bag bottom of the plastic film bottom bag produced from the blank 100A has a substantially rectangular shape (indicated by the dotted lines), but can also have a square basic shape. The bag bottom section 68A has triangularly shaped or trapezoidal extensions 102A, 104A on its opposite sides. Therefore, the blank 100A can be obtained from a single rectangular film strip by punching or cutting out four triangular or trapezoidal segments 106A, 108A, 110A and 112A. By folding up, for example, the plastic film front wall section 2A, the plastic film rear wall section 8A and the triangularly shaped or trapezoidal extensions 102A, 104A and bringing the first side wall sections 18A, 26A forming the first side wall and the second side wall sections 20A, 28A forming the second side wall towards one another, the adjoining edge contours 114A and 116A as well as 118A and 120A and likewise the edge contours of the triangular-shaped or trapezoidal extensions 122A and 124A as well as 126A and 128A, on the one side, and 130A and 132A as well as 134A and 136A on the other side are connected to one another, in some cases welded, so as to form the welded joints 63 and 65 as well as 67 and 69, respectively. In this way, it is possible to obtain the first design variant of the plastic film bottom bag according to the present disclosure. The dashed lines indicate the mutually opposite bottom side edges 150A and 152A which are obtained when completing the plastic film bag from the plastic film bag bottom section 68A.

Figure 9:
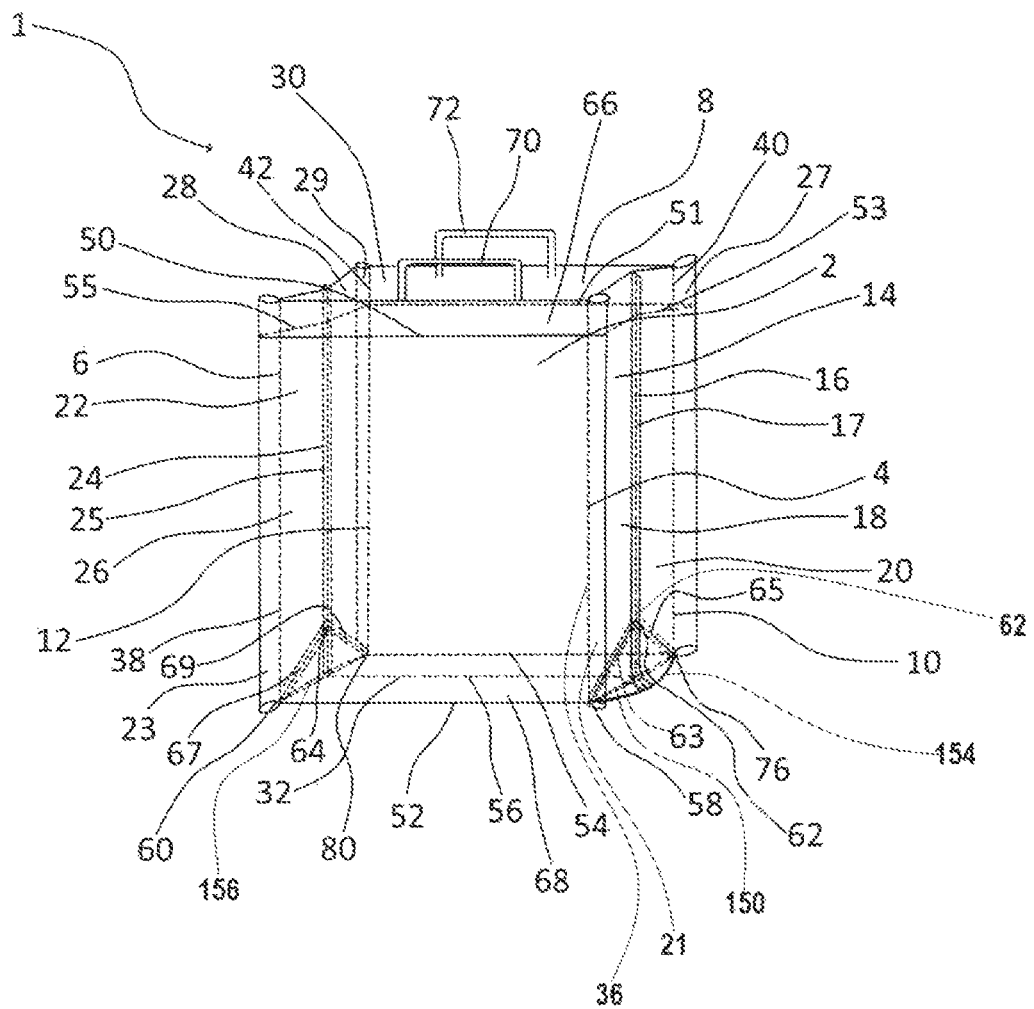
FIG. 9 shows a schematic perspective side view of a further embodiment of the third design variant of a plastic film bottom bag according to the present disclosure.
Figure 10:
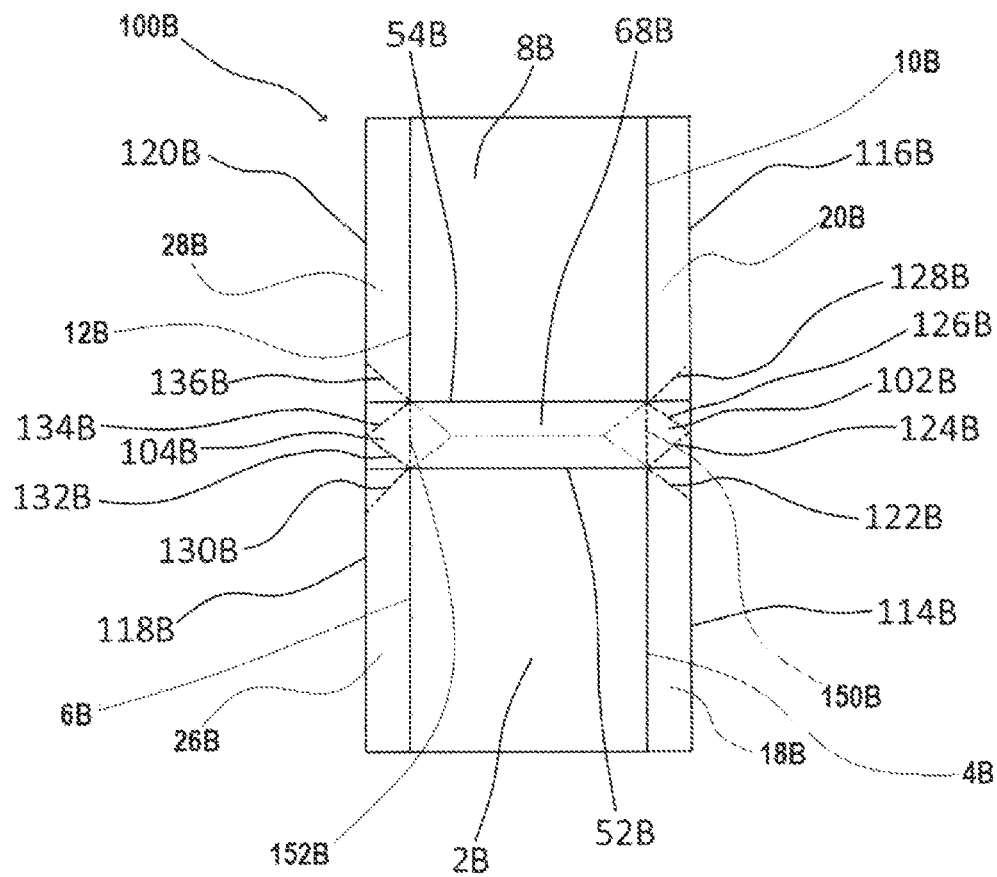
FIG. 10 shows a schematic perspective top view of a further embodiment of a film blank for a plastic film bottom bag, according to the present disclosure, of FIG. 9.

FIG. 9 shows a schematic perspective side view of a third design variant of a plastic film bottom bag according to the present disclosure, formed from a rectangular blank, as shown in FIG. 10. In this blank, features which can also be found in the blank according to FIG. 8 are labeled with identical reference signs. Since this blank does not have the triangular punched-out portions of the blank according to FIG. 8, the first side fold welded joint 16 and the second side fold welded joint 24 are formed in such a way during the joining and welding of the first side wall sections 18, 26 forming the first side wall and the second side wall sections 20B, 28 forming the second side wall that they both, unlike in the embodiment according to FIG. 1, extend up to the plastic film bag bottom. As shown in FIG. 9, substantially congruent triangular sections bear against one another in the vicinity of the plastic film bag bottom in the case of the first side wall and second side wall. These are formed during assembly of the blank, as shown in FIG. 10.

FIG. 10 shows in detail a schematic top view of a flat film blank 100B, as can be used for producing the first, second, and third design variants of a plastic film bottom bag 1 according to the present disclosure, as shown in FIG. 9, for example. The blank 100B has a plastic film front wall section 2B with a bag opening edge and a plastic film rear wall section 8B with a bag opening edge. The first side wall section 18B of the first side wall adjoins the one side of the plastic film front wall section 2B, and the first side wall section 26B of the second side wall adjoins the opposite side.

In the embodiment shown, the plastic film front wall section 2B and the first side wall sections 18B, 26B of the first and second side walls are formed in one piece. There are folds, creases or welded joints, for example in the form of a casing seam, in the transition from the plastic film front wall section 2B to said first side wall sections 18B, 26B in the finished product. Corresponding thereto, the plastic film rear wall section 8B has a second side wall section 20B of the first side wall and, on the opposite side, has a second side wall section 28B of the second side wall. The plastic film front wall section 2B and the plastic film rear wall section 8B are connected to each other in the blank 100B via the bag bottom section 68B. In the embodiment shown, the plastic film front wall section 2B, including the first side wall sections 18B, 26B, the plastic film rear wall section 8B, including the second side wall sections 20B, 28B, and the bag bottom section 68B are in one piece.

The plastic film bag bottom of the plastic film bottom bag produced from the blank 100B has a substantially rectangular shape (indicated by the dotted lines), but can also have a square basic shape. The bag bottom section 68B has rectangularly shaped extensions 102B, 104B on its opposite sides. These rectangularly shaped extensions 102B and 104B are in one piece with the first side wall sections 18B and 26B or with the second side wall sections 20B and 28B. Consequently, the blank 100B can be obtained from a single rectangular film strip. By, for example, folding up the plastic film front wall section 2B and the plastic film rear wall section 8B and bringing the first side wall sections 18B, 26B forming the first side wall and the second side wall sections 20B, 28B forming the second side wall towards one another, the adjoining edge contours 114B and 116B as well as 118B and 120B can be connected, in some cases welded, to one another so as to form the bag body. The welded joints 63 and 65 as well as 67 and 69, respectively, are formed by connecting, such as welding, to one another the areas (indicated in FIG. 10 by dashed lines) 122B and 124B as well as 126B and 128B, on the one side, and 130B and 132B as well as 134B and 136B, on the other side, which come to bear against one another when the front and rear walls are folded up. In an expedient embodiment, for this purpose, the triangular areas 102B and 104B are folded up from the plane of the bottom surface 68B, wherein at the same time the front and the rear wall sections 2B and 8B are brought towards one another such that the edge contours 114B and 116B on the one side and 118B and 120B on the other side can be connected or welded to one another. In this case, two triangular regions which are substantially congruent with one another are formed on each of the two side wall areas.

The outer triangular section of the first side wall, which is delimited by the welded joints 63 and 65, contains the first side fold welded joint 16. The inner triangular section extends from the crease line 150B to the intersection of the welded joints 63 and 65 with the first side fold welded joint 16 and the point where the dashed lines 124B and 126B meet. Similarly, corresponding inner and outer triangular sections are formed for the second side wall.

Figure 11:
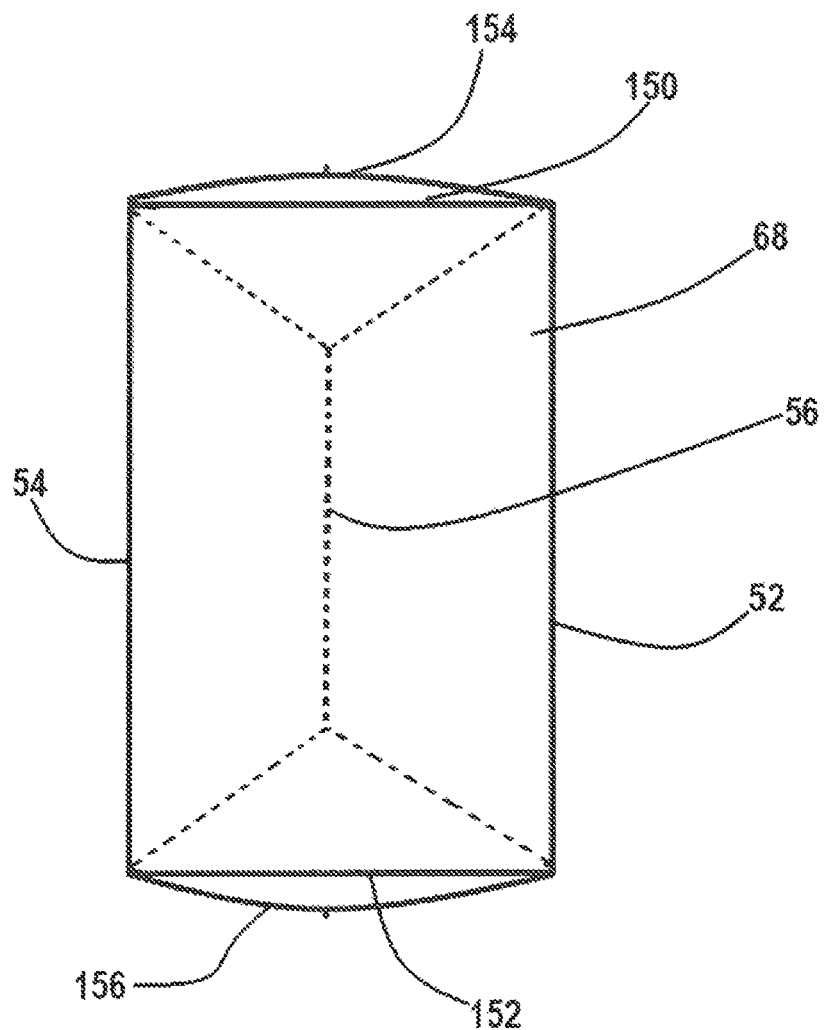
FIG. 11 shows a schematic perspective top view of the underside of the plastic film bottom bag, according to the present disclosure, of FIG. 9.

FIG. 11 shows a schematic perspective top view of the underside of the plastic film bottom bag, according to the present disclosure, of FIG. 9. The bag bottom 68 is provided with fold lines dashed line, for example in the form of the center crease 56, which allow easy folding together. The bag bottom 68 is delimited by the first bottom fold 52, the opposite second bottom fold 54 as well as the likewise mutually opposite third and fourth bottom folds 150 and 152. While the inner triangular sections described above in connection with FIG. 10 are delimited in the bottom region by the third and fourth bottom folds 150 and 152, the respective outer triangular sections are delimited by the bottom-side edge contours 154 and 156 which run substantially parallel thereto. Said inner and outer triangular sections can in this case both bear closely against one another and, as shown in FIG. 11, be at a distance from one another.

Figure 12:
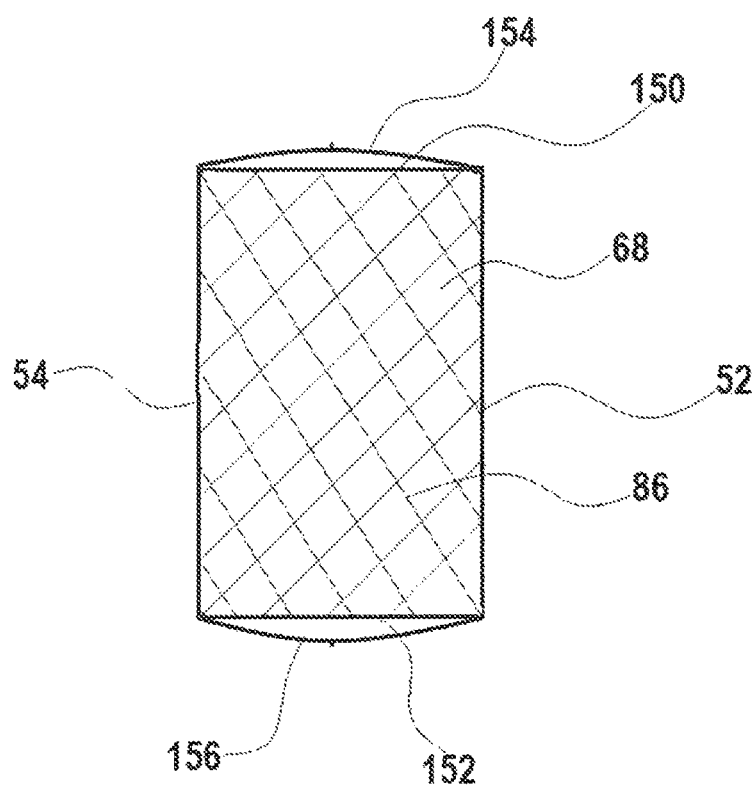
FIG. 12 shows a schematic perspective top view of the underside of a plastic film bottom bag according to the present disclosure.

FIG. 12 shows a schematic perspective top view of the underside of a plastic film bottom bag according to the present disclosure, which substantially coincides with the design of the bag bottom shown in FIG. 11. In the embodiment of the plastic film bottom bag 1, according to the present disclosure, of FIG. 12, the outer side of the bag bottom 68 is provided with a welded embossing pattern 86 in honeycomb form. By using welded embossing patterns, it is extremely efficient to attain a bag which even in the unfilled state can be kept open without external aid or auxiliary means and can thus be filled using two hands.

Figure 13:
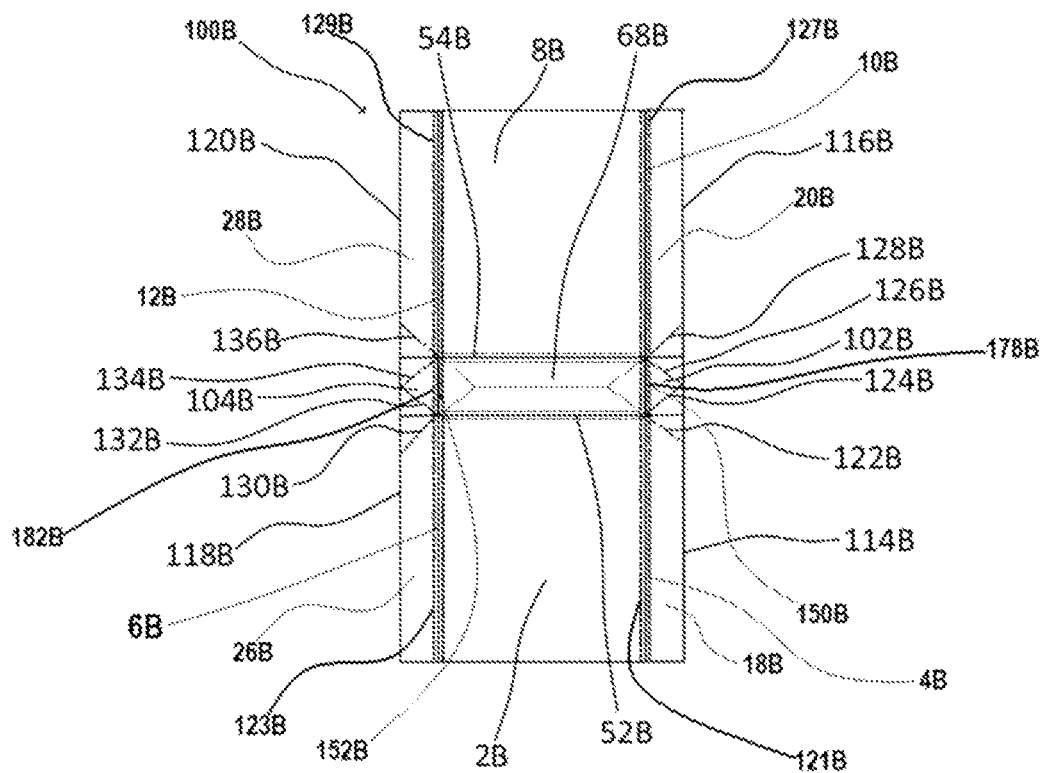
FIG. 13 shows a schematic perspective top view of a further embodiment of a film blank according to FIG. 10.

FIG. 13 shows a schematic perspective top view of a further embodiment of a film blank according to FIG. 10. The reference signs used in FIG. 13 match the corresponding reference signs of the embodiment shown in FIG. 10 for identical components. In addition to this embodiment, the film blank shown in FIG. 13 has welded joints 121B and 123B which are present along the respective mutually opposite side edge contours 4B and 6B and are expediently designed as a seam and highly expediently as a casing seam. In addition, the film blank shown in FIG. 13 has welded joints 178B and 182B which are present along the respective third and fourth bottom side edges 150B, 152B and are likewise expediently designed as a seam or a casing seam. As shown in FIG. 13, the welded joint 178B, at its mutually opposite ends, merges substantially without transition into the welded joint 121B and the welded joint 127B, and the welded joint 182B, at its mutually opposite ends, expediently also merges substantially without transition into the welded joint 123B and the welded joint 123B. The plastic film bottom bags according to the present disclosure, in some cases of the second and third design variants, are efficiently attained using the film blank shown. The plastic film front wall 2B and the plastic film bag bottom 68B are welded in the transition 52B from the plastic film front wall 2B to the plastic film bag bottom 68B so as to form a casing seam (e.g., a casing seam 74 as shown and described in FIG. 7). Corresponding thereto, in the transition 54B from the plastic film rear wall 8B to the plastic film bag bottom 68B, the plastic film rear wall 8B and the plastic film bag bottom 68B are welded so as to form a casing seam (e.g., a casing seam 84 as shown and described in FIG. 7).

The features of the present disclosure disclosed in the above description, in the claims and in the drawings can be essential both individually and in any combination for implementing the present disclosure in its various embodiments.

The various embodiments described above can be combined to provide further embodiments. All of the patents, patent applications, and non-patent publications referred to in this specification and/or listed in the Application Data Sheet are incorporated herein by reference, in their entirety. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A plastic film bottom bag having a bag opening and an opposite bag end, comprising:
a plastic film front wall having a bag opening edge and a first side edge and an opposite second side edge,
a plastic film rear wall having a bag opening edge and having a first side edge and an opposite second side edge,
a first plastic film side wall having a bag opening edge and having a first side fold extending from or at a distance from the bag opening edge in the direction of the bag end or up to the bag end, the first plastic film side wall comprising, on either side of the first side fold, a first side wall section and a second side wall section which extend from the first side fold to the first side edge of the plastic film front wall and to the first side edge of the plastic film rear wall, respectively,
a second plastic film side wall having a bag opening edge and having a second side fold extending from or at a distance from the bag opening edge in the direction of the bag end or up to the bag end, the second plastic film side wall comprising, on either side of the second side fold, a first side wall section and a second side wall section which extend from the second side fold to the second side edge of the plastic film front wall and to the second side edge of the plastic film rear wall, respectively, and a plastic film bag bottom having an inner side and an outer side, wherein:

in a transition from the plastic film front wall to the first side wall section of the first plastic film side wall, the plastic film front wall and the first side wall section of the first plastic film side wall are welded to one another so as to form a seam that extends from the bag opening edge to the plastic film bag bottom, and/or in a transition from the plastic film front wall to the first side wall section of the second plastic film side wall, the plastic film front wall and the first side wall section of the second plastic film side wall are welded to one another so as to form a seam that extends from the bag opening edge to the plastic film bag bottom, and/or in a transition from the plastic film rear wall to the second side wall section of the first plastic film side wall, the plastic film rear wall and the second side wall section of the first plastic film side wall are welded to one another so as to form a seam that extends from the bag opening edge to the plastic film bag bottom, and/or in a transition from the plastic film rear wall to the second side wall section of the second plastic film side wall, the plastic film rear wall and the second side wall section of the second plastic film side wall are welded to one another so as to form a seam that extends from the bag opening edge to the plastic film bag bottom;

wherein:

the first side fold comprises, in sections or completely, a first side fold welded seam extending from or at a distance from the bag opening edge up to the bag end, the first plastic film side wall comprising, on either side of the first side fold welded seam, the first side wall section which extends from the first side fold welded seam to the first side edge of the plastic film front wall, and the second side wall section which extends from the first side fold welded seam to the first side edge of the plastic film rear wall, and the second side fold comprises, in sections or completely, a second side fold welded seam extending from or at a distance from the bag opening edge up to the bag end, the second plastic film side wall comprising, on either side of the second side fold welded seam, the first side wall section which extends from the second side fold welded seam to the second side edge of the plastic film front wall, and the second side wall section which extends from the second side fold welded seam to the second side edge of the plastic film rear wall; and wherein:

the first side fold is an outwardly facing side fold welded seam, and the second side fold is an outwardly facing side fold welded seam, and wherein:

in a transition from the plastic film front wall to the plastic film bag bottom, the plastic film front wall and the plastic film bag bottom are welded to one another so as to form a hollow seam that extends from the first side edge to the opposite second side edge of the plastic film front wall, and in a transition from the plastic film rear wall to the plastic film bag bottom, the plastic film rear wall and the plastic film bag bottom are welded to one another so as to form a hollow seam that extends from the first side edge to the opposite second side edge of the plastic film rear wall.

2. The plastic film bottom bag according to claim 1, wherein:

the first side fold welded seam is present between the first side wall section and the second side wall section of the first plastic film side wall, and/or the second side fold welded seam is present between the first side wall section and the second side wall section of the second plastic film side wall.

3. The plastic film bottom bag according to claim 1, wherein:

in the transition from the plastic film front wall to the first side wall section of the first plastic film side wall a fold is present, and/or in the transition from the plastic film front wall to the first side wall section of the second plastic film side wall a fold is present, and/or in the transition from the plastic film rear wall to the second side wall section of the first plastic film side wall a fold is present, and/or in the transition from the plastic film rear wall to the second side wall section of the second plastic film side wall a fold is present.

4. The plastic film bottom bag according to claim 1, wherein:

the plastic film front wall has a single-layer or multi-layer film strip on the inside and/or outside of the plastic film front wall in a region of the bag opening edge, and/or the plastic film rear wall has a single-layer or multi-layer film strip on the inside and/or outside of the plastic film rear wall in a region of the bag opening edge, and/or the first plastic film side wall has a single-layer or multi-layer film strip on the inside and/or outside of the first plastic film side wall in a region of the bag opening edge; and/or the second plastic film side wall has a single-layer or multi-layer film strip on the inside and/or outside of the second plastic film side wall in a region of the bag opening edge.

5. The plastic film bottom bag according to claim 4, wherein the single- or multi-layer film strip constitutes an opening edge seam and/or is formed in one piece with the plastic film front wall, the plastic film rear wall, the first plastic film side wall, or the second plastic film side wall.

6. The plastic film bottom bag according to claim 5, wherein:

a first carrying element is attached or is present in the opening edge seam of the plastic film front wall, and a second carrying element is attached or is present in the opening edge seam of the plastic film rear wall.

7. The plastic film bottom bag according to claim 4, wherein the single-layer or multi-layer film strip is on the inside in the region of the bag opening edge.

8. The plastic film bottom bag according to claim 4, wherein the single-layer or multi-layer film strip is a component of the plastic film front wall, the plastic film rear wall, the first plastic film side wall, and/or the second plastic film side wall.

9. The plastic film bottom bag according to claim 1, wherein said plastic film bottom bag does not have any further welded seam extending from or at a distance from the bag opening edge in the direction of the bag end or up to the bag end.

10. The plastic film bottom bag according to claim 1, wherein:
the plastic film front wall and/or plastic film rear wall have/has a single- or multi-layer film material, and/or film material of the plastic film front wall and/or plastic film rear wall comprises or consists of polyolefins.

11. The plastic film bottom bag according to claim 10, wherein the film material of the plastic film front wall and plastic film rear wall comprises or consists of HD polyethylene.

12. The plastic film bottom bag according to claim 1, wherein:
said plastic film bottom bag is formed substantially in one piece; and/or
the plastic film front wall, the plastic film bag bottom, and the plastic film rear wall are present in a contiguous manner, and/or
the plastic film front wall, the first side wall section of the first plastic film side wall, and the first side wall section of the second plastic film side wall are present in a contiguous manner, and/or
the plastic film rear wall, the second side wall section of the first plastic film side wall, and the second side wall section of the second plastic film side wall are present in a contiguous manner.

13. The plastic film bottom bag according to claim 1, wherein the plastic film bag bottom has a central fold or crease which extends at a distance from or from the first side edge in the direction of or up to the opposite second side edge.

14. The plastic film bottom bag according to claim 1, wherein the width of the plastic film front wall and/or the width of the plastic film rear wall is greater than or equal to the sum formed from the width of the first side wall section of the first plastic film side wall and the first side wall section of the second plastic film side wall and/or the sum formed from the width of the second side wall section of the first plastic film side wall and the second side wall section of the second plastic film side wall.

15. The plastic film bottom bag according to claim 1, wherein the plastic film bag bottom has an embossing welding pattern.

16. The plastic film bottom bag according to claim 15, wherein the embossing welding pattern comprises or constitutes a honeycomb structure, a line structure, or an annular structure.

17. The plastic film bottom bag according to claim 1, further comprising:
a first welded or adhesive joint that extends from a first mouth point in which a first bottom crease leads into the first side edge of the plastic film front wall to the first side fold welded seam which ends at a distance from the plastic film bag bottom, and
a second welded or adhesive joint that extends from a second mouth point in which a second bottom crease leads into the first side edge of the plastic film rear wall to the first side fold welded seam which ends at a distance from the plastic film bag bottom, and/or
a third welded or adhesive joint that extends from a third mouth point in which the first bottom crease leads into the second side edge of the plastic film front wall to the second side fold welded seam which ends at a distance from the plastic film bag bottom, and
a fourth welded or adhesive joint that extends from a fourth mouth point in which the second bottom crease leads into the second side edge of the plastic film rear wall to the second side fold welded seam which ends at a distance from the plastic film bag bottom.

18. The plastic film bottom bag according to claim 17, wherein:
the first side fold welded seam, the first welded or adhesive joint, and the second welded or adhesive joint have a common mouth region, and/or
the second side fold welded seam, the third welded or adhesive joint, and the fourth welded or adhesive joint have a common mouth region.

19. The plastic film bottom bag according to claim 1, further comprising:
at least one first carrying element on the plastic film front wall and/or at least one second carrying element on the plastic film rear wall.

20. The plastic film bottom bag according to claim 19, wherein the at least one first carrying element and/or the at least one second carrying element constitutes a grip hole, a holding loop, or a handle.

21. The plastic film bottom bag according to claim 19, wherein:
the first carrying element is attached or is present in the region of the single- or multi-layer film strip of the plastic film front wall; and/or
the second carrying element is attached or is present in the region of the single- or multi-layer film strip of the plastic film rear wall.

22. The plastic film bottom bag according to claim 1, further comprising:
an inlay bottom.

23. The plastic film bottom bag according to claim 22, wherein the inlay bottom is more rigid than the plastic film bag bottom.

24. A blank for a plastic film bottom bag according to claim 1, made of a single- or multi-layer plastic film having a plastic film front wall section, a substantially rectangular or square plastic film bag bottom section adjoining the plastic film front wall section along a first bottom side edge, and a plastic film rear wall section adjoining said plastic film bag bottom section, opposite the plastic film front wall section, along a second bottom side edge, wherein triangular or trapezoidal sections respectively adjoin opposite third and fourth bottom side edges of the plastic film bag bottom section which are not connected to the plastic film front wall section and the plastic film rear wall section,
wherein the plastic film front wall section has, on side edge contours which are opposite each other an extension section in each case, with an inclined bottom-side edge which forms an obtuse angle ($\alpha$) with the first bottom side edge when the blank is arranged in a plane, wherein the distance between the opposite side edge contours of the plastic film front wall section substantially corresponds to the distance between the third and fourth bottom side edges, and
wherein the plastic film rear wall section has, on side edge contours which are opposite each other an extension section in each case, with an inclined bottom-side edge which forms an obtuse angle ($\alpha'$) with the second bottom side edge when the blank is arranged in a plane, wherein the distance between the opposite side edge contours of the plastic film rear wall section substantially corresponds to the distance between the third and fourth bottom side edges.

25. A blank for a plastic film bottom bag according to claim 1, having a substantially rectangular or square basic shape and made of a single-layer or multi-layer plastic film, comprising:

a plastic film front wall section, a substantially rectangular or square plastic film bag bottom section adjoining the plastic film front wall section along a first bottom side edge, and containing third and fourth bottom side edges which are opposite each other, and a plastic film rear wall section which adjoins said plastic film bag bottom section, opposite the plastic film front wall section, along a second bottom side edge, wherein the plastic film front wall section has a substantially rectangular extension section in each case on side edge contours which are opposite each other, wherein the plastic film rear wall section has a substantially rectangular extension section in each case on side edge contours which are opposite each other, wherein a welded joint is present along the side edge contours, which are opposite each other, of the plastic film front wall section, and wherein a welded joint is present along the side edge contours, which are opposite each other, of the plastic film rear wall section.

26. The blank according to claim 25, wherein a welded joint is present along the third and fourth bottom side edges, respectively.

27. The blank according to claim 25, wherein the welded joints form a hollow seam that extends from the bag opening edge to the plastic film bag bottom.

28. Use of a plastic film bottom bag according to claim 1 as a reusable bag or reusable handbag.

29. The plastic film bottom bag according to claim 1, wherein:

the plastic film front wall and the first side wall section of the first plastic film side wall are welded to one another along and in a region of a fold or crease so as to form a hollow seam that extends from the bag opening edge to the plastic film bag bottom, or the plastic film front wall and the first side wall section of the second plastic film side wall are welded to one another along and in a region of a fold or crease so as to form a hollow seam that extends from the bag opening edge to the plastic film bag bottom, or the plastic film rear wall and the second side wall section of the first plastic film side wall are welded to one another along and in a region of a fold or crease so as to form a hollow seam that extends from the bag opening edge to the plastic film bag bottom, or the plastic film rear wall and the second side wall section of the second plastic film side wall are welded to one another along and in a region of a fold or crease so as to form a hollow seam that extends from the bag opening edge to the plastic film bag bottom.

30. The plastic film bottom bag according to claim 1, wherein the first side fold is in sections or completely in the form of an outwardly facing side fold welded joint, and wherein the second side fold is in sections or completely in the form of an outwardly facing side fold welded joint.

31. The plastic film bottom bag according to claim 1, wherein the first plastic film side wall is provided with the first side fold welded seam and wherein the second plastic film side wall is provided with the second side fold welded seam.

32. The plastic film bottom bag according to claim 1, wherein:

the first side fold welded seam has an average width in a range from 1.0 to 4.0 mm, and the second side fold welded seam has an average width in a range from 1.0 to 4.0 mm.

33. The plastic film bottom bag according to claim 1, wherein:

in a transition from the first plastic film side wall to the plastic film bag bottom, the first plastic film side wall and the plastic film bag bottom are welded to one another so as to form a hollow seam, and in a transition from the second plastic film side wall to the plastic film bag bottom, the second plastic film side wall and the plastic film bag bottom are welded to one another so as to form a hollow seam.

* * * * *